United States Patent
Wolf et al.

[11] 3,735,380
[45] May 22, 1973

[54] SEAT SENSING MECHANISM

[75] Inventors: Walter A. Wolf; Prentice R. Corn, both of Logansport, Ind.

[73] Assignee: Switches, Incorporated, Logansport, Ind.

[22] Filed: Mar. 2, 1971

[21] Appl. No.: 120,263

[52] U.S. Cl............340/278, 200/61.58 B, 200/85 A
[51] Int. Cl..........................G08b 5/00, H01h 3/02
[58] Field of Search................340/278, 272, 52 E; 200/61.58 B, 85, 85 A, 86; 180/82.8, 101, 102

[56] References Cited
UNITED STATES PATENTS

| | | | |
|---|---|---|---|
| 3,343,624 | 9/1967 | Shaheen | 340/278 X |
| 3,449,714 | 6/1969 | Farley, Jr. | 340/278 X |
| 3,438,455 | 4/1969 | Redmond | 340/278 |
| 3,487,451 | 12/1969 | Fontaine | 200/85 X |
| 3,485,974 | 12/1969 | Wolf et al. | 200/61.57 |
| 3,315,050 | 4/1967 | Miller | 200/86 |
| 3,396,252 | 8/1968 | Serizawa et al. | 200/86 |
| 3,511,328 | 5/1970 | Webb | 200/86 |
| 3,553,404 | 1/1971 | Koenig | 200/85 |

Primary Examiner—John W. Caldwell
Assistant Examiner—Scott F. Partridge
Attorney—Dressler, Goldsmith, Clement & Gordon

[57] ABSTRACT

A seat sensing mechanism incorporated into an automobile seat and forming part of a circuit having a warning device and a switch cooperating with seat belts for maintaining an occupant within the seat. The seat sensing mechanism includes an elongated switch consisting of a pair of elongated electrically conductive contact strips that are normally held in spaced relation by a resilient member having a passage for receiving the strips. An elongated actuating member having depressions extending towards the switch is held adjacent the switch and the entire sensing mechanism is enclosed in a casing.

18 Claims, 12 Drawing Figures

PATENTED MAY 22 1973 3,735,380

INVENTORS
Walter A. Wolf
Prentice R. Corn
by Dressler Goldsmith
Clement & Gordon  Attys

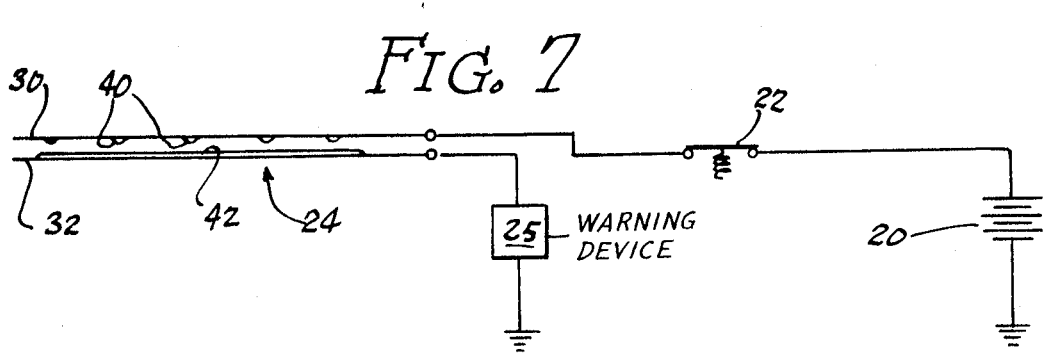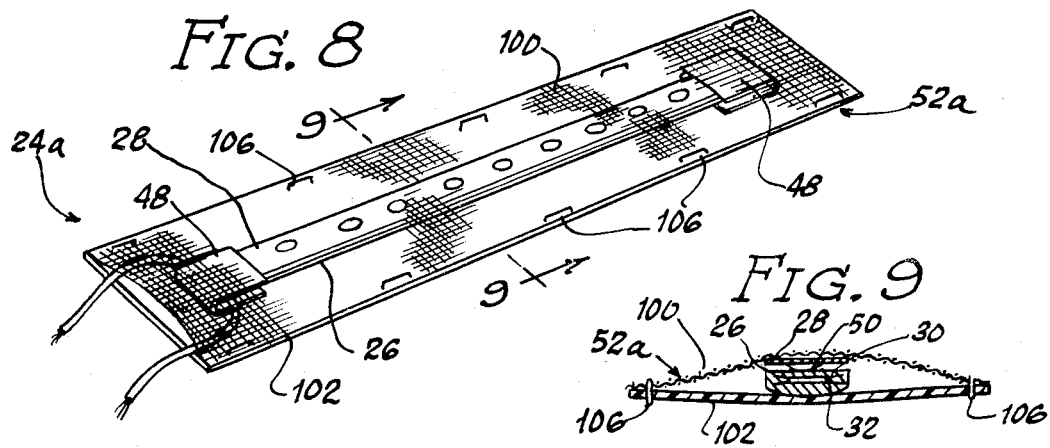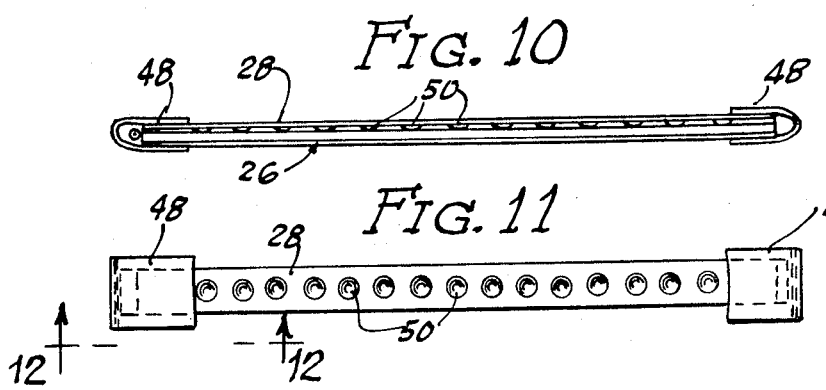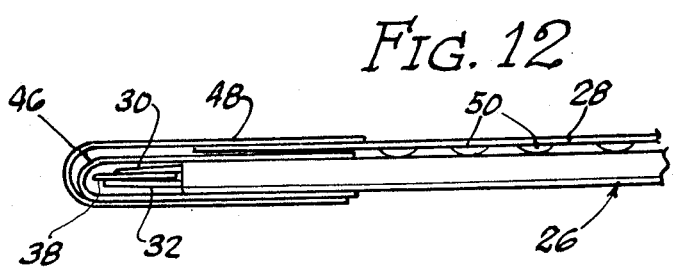

SEAT SENSING MECHANISM

BACKGROUND OF THE INVENTION

The present invention relates generally to switches and more particularly to an improved seat sensing switch for use as part of a warning system in an automobile.

With the recent emphasis upon safety in the automobile industry and the entry of a federal government into the field for policing safety, numerous safety and warning devices have been incorporated into present day automobiles. For example, the federal government has recently required that each new automobile sold must incorporate a sufficient number of seat belts to allow at least one seat belt for each occupant of the automobile. While this requirement was readily satisfied by the automobile industry, one of the problems encountered was the fact that the occupants of the vehicle did not use the seat belts in many instances thereby negating the possible elimination of injury in an automobile accident, as was envisioned by the requirement of seat belts.

Thus, the industry and the federal government searched for a solution to at least partially overcome the problem of the occupant neglecting to fasten the seat belt while the automobile is being operated. The solution to this problem appeared to the federal authorities as requiring some type of warning system that would indicate when the occupant was in the seat and the seat belt was not fastened. In addition to the broad encompassing requirement by the federal government, additional specific requirements were made that must be complied with by the auto industry. The auto industry in turn made numerous additional requirements which had to be met by suppliers of the various elements that were needed to comply with the federal regulations.

SUMMARY OF THE INVENTION

The present invention contemplates a warning system that indicates that failure to fasten the seat belt by the occupant of the seat and in which a sensing element is incorporated into the seat structure.

The warning system of the present invention includes a circuit having a warning device incorporated therein, first switch means cooperating with seat belts located adjacent a seat and second switch means incorporated in the seat structure with the circuit being arranged to activate the warning device when an occupant occupies the seat and fails to place the seat belt in occupant encompassing relation. The second switch means or seat sensing mechanism includes a switch having a movable element moved in response to compression of cushioning material that forms part of the seat or load supporting member to actuate the switch. An elongated actuating strap or member cooperates with the movable element and extends generally parallel between upper and lower surfaces of the load supporting member. The actuating element is deflected from a normal position in response to a load being applied to the upper surface of the load supporting member to actuate the switch.

In a more specific embodiment, the seat sensing mechanism includes an elongated strip switch that consists of a pair of elongated switch contacts which are normally held in spaced relation below the upper surface of the seat by support means or a resilient member having a passageway extending therethrough and receiving the elongated switch contacts. The elongated actuating member is in the form of a generally flat narrow strap of spring steel that is substantially coextensive with one of the switch contacts, the latter acting, as the movable member of the switch. The switch and the actuator are enclosed in a casing or jacket so that the entire sensing mechanism can be incorporated into the seat cushioning material without the cushioning material having deleterious effects on the operation of the sensing mechanism. Preferably the entire unit is then sealed to be waterproof.

In one specific embodiment, the seat sensing mechanism further includes a second elongated narrow flat spring metal strap that is located below the switch within the casing and the casing consists of a substantially rectangular hollow resilient member having opposite sides of bellows construction accommodating ready deformation of the sides upon the compression of the cushioning material.

In an alternate embodiment, the actuating strap and switch are interconnected at opposite ends and the jacket consists of an upper and lower membrane interconnected along their peripheral edges. The upper member may consists of a woven metal wire fabric while the lower member may consist of a sheet of resinous material, each of which has sufficient rigidity to be substantially self-supporting in a single plane. In this arrangement, the switch and actuating member are sandwiched between the upper and lower membrane so that any deflection of the membranes towards each other will cause activation of the switch.

BRIEF DESCRIPTION OF SEVERAL VIEWS OF DRAWINGS

FIG. 7 is a schematic illustration of the electrical circuit forming part of the warning system of the present invention;

FIG. 8 is a perspective view of a slightly modified form of the seat sensing mechanism shown in FIGS. 2–6;

FIG. 9 is a sectional view taken generally along line 9—9 of FIG. 8;

FIG. 10 is a side elevation view of the switch and actuator;

FIG. 11 is a plan view of the switch and actuator shown in FIG. 10; and

FIG. 12 is an enlarged fragmentary side elevation taken generally along line 12—12 of FIG. 11.

DETAILED DESCRIPTION

Figure 1:
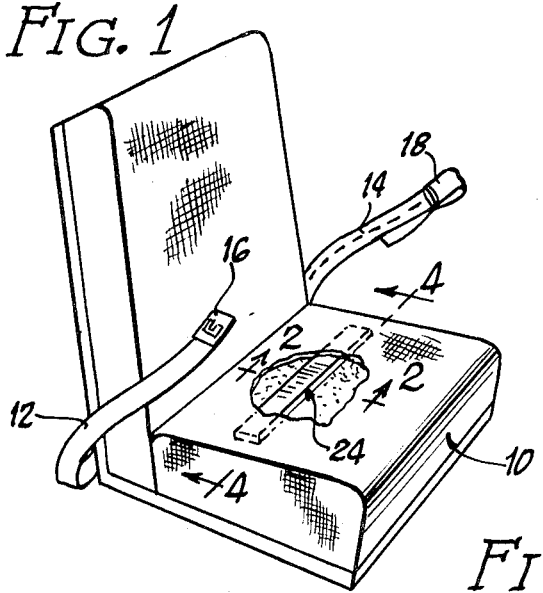
FIG. 1 is a fragmentary perspective view of a seat having seat belts associated therewith and incorporating the present invention.
Figure 2:
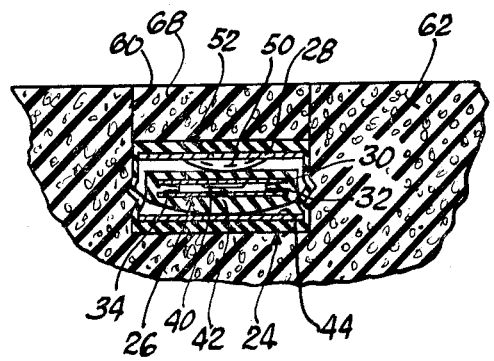
FIG. 2 is a vertical section taken generally along line 2—2 of FIG. 1.

While this invention is susceptible of embodiment in many different forms, there is shown in the drawings and will therein be described in detail two specific embodiments, with the understanding that the present disclosure is to be considered as an exemplification of the principles of the invention and is not intended to limit the invention to the embodiments illustrated.

FIG. 1 of the drawings discloses a seat generally designated by the reference numeral 10, and having a seat belt consisting of seat belt portions 12 and 14 attached to a support adjacent the seat and cooperating therewith. Releasable latch means or a belt buckle cooperates with the seat belt portions and has a first portion 16 attached to the seat belt portion 12 and a second portion 18 attached to the seat belt portion 14. Thus, the latch portions 16 and 18 may be interconnected to locate the seat belt in an occupant encompassing relation to a person occupying the seat.

As was indicated above, the installation of seat belts in all new automobiles sold is now a mandatory requirement in an effort to reduce the number of injuries resulting from accidents. However, actual surveys have shown that many people do not utilize the seat belts for their intended purpose.

In order to overcome this problem, it will soon become mandatory for the automobile manufacturers to incorporate some sensing device that indicates that an occupant has failed to fasten the seat belt while occupying the seat.

According to the invention, a warning system cooperates with the seat and the seat belt and includes a circuit having a warning device incorporated therein with first switch means in the circuit cooperating with the seat belt and second switch means within the seat. The first and second switch means are arranged for actuating the warning device when an occupant occupies the seat and the seat belt is not in an occupant encompassing relation. The electrical circuit is most clearly schematically shown in FIG. 7 and includes a power source 20, such as the battery of the automobile, a first switch means 22, a second switch means 24 and a warning device 25, such as an alarm giving an audio signal, as will be described in more detail later. The circuit and switches may be arranged in any manner or order and an exemplary circuit has been shown in which the first switch means 22 is a normally closed switch and the second switch means 24 is a normally open switch. However, it should be noted that this arrangement is for purposes of illustration only.

The first switch means is designed to cooperate with the seat belt to give an indication that the seat belt is in an occupant encompassing relation and the belt buckle 16,18 is latched. Thus, for example, the first switch could be a normally closed switch cooperating with the storage compartment that is normally found in automobiles to house one portion of the seat belt adjacent the door when the seat belt is not being used. The normally closed switch 22 could be supported adjacent the housing and then biased to an open position when the seat belt was withdrawn from the housing. Alternatively, the switch 22 could be incorporated into the buckle itself so as to be opened only when the buckle portions 16 and 18 are interconnected.

It will be appreciated that the seat sensing mechanism or second switch means must be capable of operating under various conditions and at all times be actuated with a minimum amount of pressure being applied thereto, such as the amount of pressure that would be encountered by the seat when a small child weighing on the order of 40 pounds were to occupy the seat and fail to fasten the seat belt. A further problem encountered in producing a satisfactory seat sensing mechanism is that the cushioning material or foam in the seat does not have sufficient rigidity to provide an actuation of the switch with such a minimum amount of force. In addition, the seat sensing mechanism should not have any affect on the aesthetic appearance of the automobile.

All of these problems are solved by a simple and inexpensive seat sensing mechanism or switch means that can be actuated with a minimum amount of force being applied thereto. The structural details of the seat sensing mechanism will first be described and its operation, advantages and arrangement with the remainder of the environment will then be discussed.

The seat sensing mechanism 24 consists of a switch 26 and an elongated actuating member or strap 28 that extends generally parallel to the upper surface of the seat 10 and is deflected from a normal position in response to a load being applied to the seat or load supporting member to actuate the switch 26. The switch 26 is preferably of the type disclosed and claimed in Wolf et al. U.S. Pat. No. 3,485,974 issued on Dec. 23, 1969 and assigned to the assignee of the present application. As is described in more detail in this patent, which is incorporated herein by reference, the switch 26 consists of first and second or upper and lower elongated switch contacts 30 and 32 that are normally held in spaced relation below the upper surface of the seat by a resilient member 34 having an elongated passage 36 for receiving the elongated switch contacts or resilient metal contact strips 30 and 32. In order to maintain the contacts or strips in the normally spaced relation, the elongated passage 36 is substantially rectangular and has outwardly directed horizontally disposed recesses on each of the four corners of the passage. The flat metal strips 30 and 32 are received in respective pairs of opposed recesses and are thus held in a spaced relation. In addition, insulating spacers 38 are interposed between the strips at opposite ends to provide a permanent spacing at both ends.

Preferably, in order to provide point contact between the two elements, the upper or first contact strip 30 has a plurality of longitudinally spaced transversely extending ribs or projections 40 (FIG. 7) extending from the lower surface of the strip while the lower or second contact strip 32 has a single longitudinal rib or bead 42 extending longitudinally thereof. With this arrangement, substantial point contact is produced when the two strips are moved towards each other. The advantages of the point contact are outlined in the above mentioned patent and will not be repeated at this point.

Figure 5:
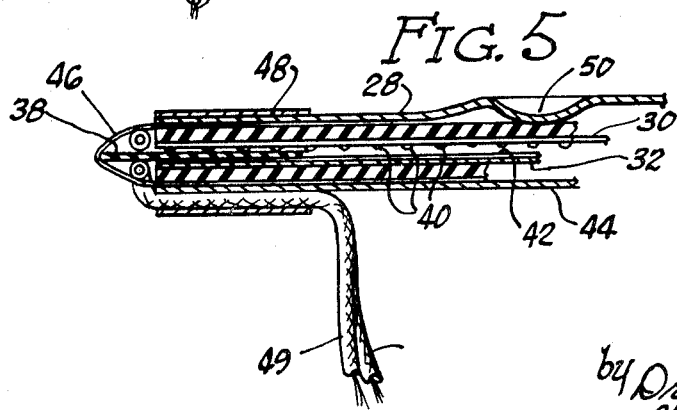
FIG. 5 is an enlarged fragmentary sectional view taken generally along line 5—5 of FIG. 3.

The switch means 24 further includes an elongated spring metal supporting strap 44 that is located adjacent the lower surface of the resilient member 34. The spring metal supporting strap as well as the spring metal actuating strap 28 are interconnected adjacent opposite ends thereof with the switch 26 being held between the two straps. The spacer retention means is illustratively shown as any type of adhesive taping 46 that is interposed between the upper actuating strap 28 and the upper surface of the resilient member 34 and engages the outer edge of the insulating spacer 38. The tape extends around the end of the spacer 38 and terminates between the resilient member 34 and the lower supporting strap 44. As is more clearly shown in FIG. 5, two leads 49 are respectively connected to the contact strips. The means for interconnecting opposite ends of the straps and the switch includes a further strip of tape 48 that extends around the opposite ends of the straps 28 and 44 as well as the switch 26. Of course, it will be appreciated that various other alternates to the tapes may be used for retaining the spacer and holding the switch and straps in an assembled condition. In fact, when the switch and straps are enclosed in a casing as described below, the interconnecting means could be completely eliminated.

According to one of the principle aspects of the present invention, the actuating strap 28 has a plurality of longitudinally spaced projections or dimples 50 that are deformed from the substantially flat metal strap towards the first contact strip 30 so as to produce substantial point contact at spaced locations between the actuating strap 28 and the resilient member or cored extrusion 34. Preferably, the projections or dimples 50 have their lower surfaces deformed from the main body of the strap 28 a distance greater than the vertical spacing between the transverse and longitudinal ribs 40 and 42 on the switch contacts 30 and 32. The advantage of this arrangement will be described hereinafter.

Figure 3:
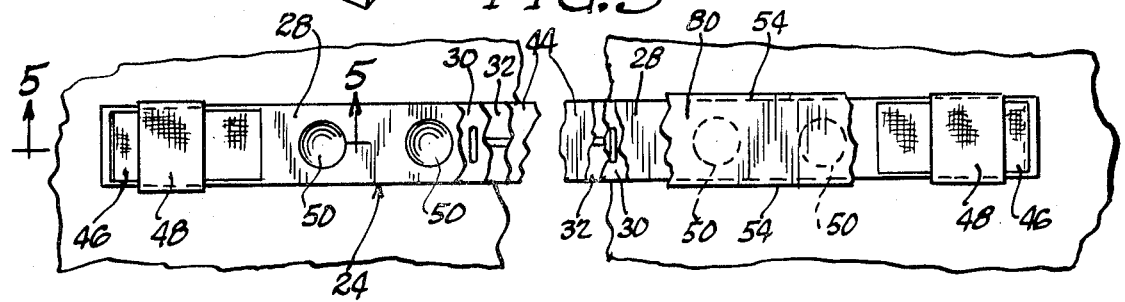
FIG. 3 is an enlarged fragmentary plan view of the seat with portions thereof broken away to show the various elements forming part of the seat sensing mechanism.
Figure 4:
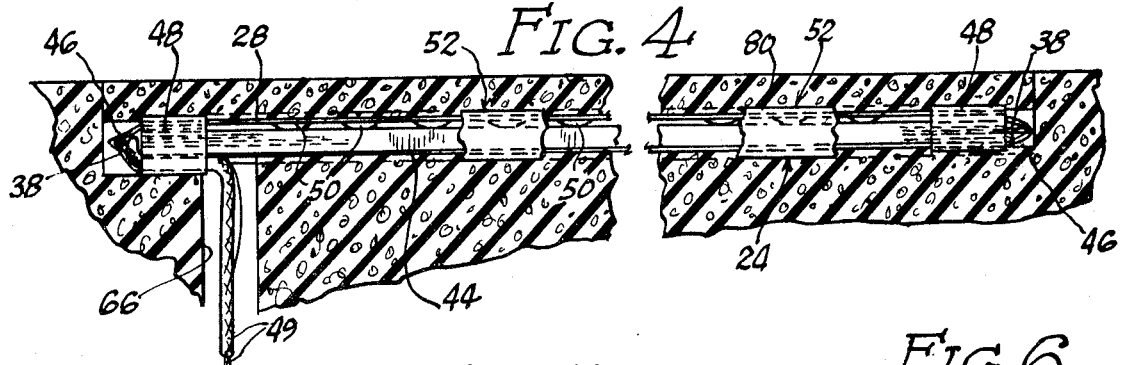
FIG. 4 is an enlarged fragmentary sectional view taken generally along line 4—4 of FIG. 1.
Figure 6:
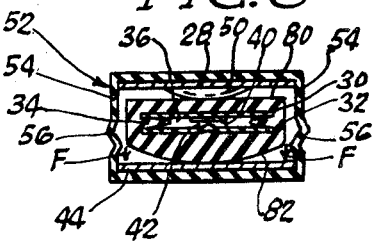
FIG. 6 is an enlarged fragmentary vertical sectional view of the seat sensing mechanism.

The last element of the switch means or seat sensing mechanism 24 includes a resilient outer jacket or casing 52 (FIG. 6) that is hollow and of substantially rectangular cross-sectional configuration. The spaced vertical sides 54 of the hollow rectangular casing or jacket 52 have accordion pleats 56 defined therein so as to define a bellows construction accommodating ready deformation of the sides 54 upon compression of the casing, as will be described later. For purpose of clarity and to show the location of the various elements, only portions of the casing 52 have been shown in FIGS. 3 and 4.

The seat sensing mechanism or switch means 24 is installed into the load supporting member or seat 10 between the upper and lower surfaces thereof by producing an elongated recess 60 in the upper surface of the cushioning material or foam 62 defining the seat structure. The elongated switch is then inserted into the recess 60 in a manner that the lower or second elongated spring metal strap 44 is located in the bottom of the recess with the casing between the wall of the recess and the strap 44. The first elongated switch contact 30 that acts as the movable element for the switch is located above the second or lower switch contact 32 while the elongated spring metal actuating strap is located between the first contact and the upper surface of the seat 10. The leads 49 extend through an opening 66 that terminates adjacent the lower surface of the seat so as to be interconnected with the first switch cooperating with the seat belt and the remainder of the warning system circuit.

After the switch has been inserted in this manner, the plug 68 of cushioning material is located above the switch and the leather upholstery or other covering (not shown) is superimposed on the upper surface to completely enclose the switch means 24 within the seat.

It should be noted that the respective elongated resilient supporting straps are substantially coextensive with the respective switch contacts but have a transverse dimension that is slightly greater than the transverse dimension of the casing or resilient member 34. Also, the straps each have sufficient rigidity to remain in a substantially planar condition when no load is supported on the load supporting member. With this arrangement, the spring metal straps 28 and 44, as well as the switch 26, will have a normal position in which all of the elements extend generally parallel to the upper surface of the cushioning material 62 but are located below this surface.

The downwardly depending projections or dimples 50 substantially increase the sensitivity of the switch means 24 and allow the switch to be actuated with forces being applied in a localized area along any portion of the upper surface of the casing or jacket 52. It will be appreciated that the projections or dimples will allow the switch to be actuated without the necessity of compressing the entire casing 34 sufficiently to allow the contact to be made between the conductive strips. Thus, summarizing briefly, the dimples or projections substantially increase the sensitivity of the switch means since actuation of the switch can be accomplished by depressing only one of the many dimples downward sufficiently to cause engagement of the switch contact.

According to a further aspect of the present invention, the sensitivity of the switch is increased by the specific construction of the resilient member 34 and its arrangement in the seat sensing mechanism. As is more clearly shown in FIG. 6, a resilient member or support means 34 includes a hollow ribbon or extrusion of substantially rectangular peripheral configuration that has upper and lower surfaces 80 and 82. The upper surface is substantially flat while the lower surface is convex or crowned. Since the straps 28 and 44 are substantially flat between opposite edges thereof, except for the dimples or depressions 50 in the upper strap 28, a minimum area of contact will be made between the lower supporting strap 44 and the surface 82 of the hollow ribbon 34. With this arrangement, an application of force downwardly on the upper surface of the casing 52 will cause a downward movement of the entire switch 24 while the projections simultaneously cause a downward movement of the upper portion of the hollow casing 34 towards the lower portion of the casing 34. Simultaneous to this movement, the central portion of the lower section of the hollow ribbon is restrained from movement while the opposite side edges or areas are capabable of being moved downwardly, as indicated by the arrows F in FIG. 6. Therefore, the sensitivity of the switch means is substantially increased because the center area of the lower strip 32 between the opposite edges is held relatively stable while the greatest amount of downward movement of the upper strip or movable element is the central portion between its opposite edges with limited restriction at its outer edges since edges of casing 34 are free to deflect. In addition, the bellows construction of the side wall 54 of the casing 52 further adds to the sensitivity of the switch means 24 since it allows deformation of the casing with a minimum amount of force.

A slightly modified form of the present invention is shown in FIGS. 8–12. The major difference between the embodiments of FIGS. 2–6 and FIGS. 8–12 relates to the support means which includes the lower elongated metal strap 44 and the casing 52 in the embodiment of FIG. 6.

Since many of the elements of the modified form of the invention are substantially identical to that described in connection with FIGS. 1–6, like reference numerals have been applied to identical elements.

The embodiment of FIGS. 8–12 eliminates the need for a lower supporting strap 44 except where extreme sensitivity is required and the function of the strap is incorporated into the lower element 102 of the jacket or casing 52a. Furthermore, the parts, particularly the switch 26 and the actuating member 28, are arranged in a manner that the switch means 24a is specifically designed for use between springs and cushioning material, between cushion material and heavy padded covering, or enclosed within the cushioning material.

The switch means or seat sensing mechanism 24a includes the switch 26 and the actuating member 28 (FIG. 9) identical to that described above.

The jacket or casing 52a includes an upper membrane 100 and a lower membrane 102 that are interconnected along their peripheral edge by interconnecting means illustrated as staples 106. The upper and lower membranes 100 and 102 each have sufficient rigidity to be substantially self-supporting in a single plane and have the switch 26 and the actuating member 28 sandwiched therebetween. In the illustrated embodiment, the lower membrane 102 consists of a sheet of resinous material while the upper membrane consists of a woven metal wire fabric, commonly referred to as a screen.

An inspection of FIGS. 10–12 reveals that the lower supporting member 44 of the switch means is eliminated and the function of the lower supporting member for the switch is performed by the lower membrane 102.

The operation of the modified form of switch means 24a is substantially identical to that described above. The arrangement and nature of the various elements forming the switch means are specifically designed to allow the switch means to be inserted at any depth above the prime support means such as springs for the cushioning material 62. In its installed position, the lower resinous or plastic membrane 102 acts as a support means for the switch 26 while the upper membrane or screen 100 concentrates pressure on actuating member 28 to move the movable contact element 30 downward into engagement with the substantially fixed contact element 32.

In both embodiments of the present invention, the entire seat sensing mechanism can readily be manufactured from commercially available parts including the patented switch 26, the metal straps, and adhesive or an inexpensive resilient or rubber casing or a few pieces of adhesive tape for properly interconnecting the various elements. The seat sensing mechanism does not have any parts that would require replacement after a period of use. As is explained in more detail in the above mentioned patent, the switch has an extremely long life due to its multiple contacts and thus would outlast the life of virtually any commercial vehicle available today.

We claim:

1. In combination with a load supporting member having a cushioning material between upper and lower surfaces thereof and compressible in response to a load being applied to the upper surface thereof, a switch cooperating with said load supporting member, said switch having first and second resilient metal strips; a resilient non-conductive member having an elongated passage receiving said strips and normally maintaining said strips in spaced parallel relation; and an elongated resilient actuating strap having sufficient rigidity to remain in a substantially planar condition when no load is applied to the upper surface of said load supporting member, said strap extending generally parallel to said upper surface and below said upper surface, said actuating strap engaging said non-conductive member adjacent said first resilient metal strap and being deflected between opposite ends from a normal position in response to a load being applied to the upper surface of said load supporting member to produce engagement between said metal strips.

2. The combination as defined in claim 1, in which said first strip is located above said second strip and said actuating strap is located between said first strip and said upper surface, said actuating strap having projections extending towards said first strip, the further improvement of an elongated resilient supporting strap below and adjacent said second strip.

3. The combination as defined in claim 1, in which said actuating strap is an elongated spring metal strap substantially coextensive with said first strip and has projections extending towards said first strip, the further improvement of a jacket enclosing said switch and said actuating strap.

4. The combination as defined in claim 3, in which said jacket includes an upper membrane and a lower membrane interconnected along their peripheral edges, said upper membrane consisting of a woven wire fabric and said lower membrane consisting of a sheet of resinous material, said membranes having sufficient rigidity to be substantially self-supporting in a single plane.

5. The combination as defined in claim 3, in which said first strip is located above said second strip and said jacket includes a substantially rectangular casing having opposite sides of bellows construction accommodating ready deformation of said sides upon compression of said cushioning material, the further improvement of a second elongated spring metal strap between said casing and said resilient non-conductive member and being substantially coextensive with said second strip.

6. In combination with a seat having a seat belt including first and second portions each having one end secured adjacent said seat and adapted to surround an occupant with releasable latch means adjacent free ends of said portions, said latch means adapted to be interconnected to locate said seat belt in an occupant encompassing relation and maintain the occupant strapped in said seat, a warning system comprising a circuit having a warning device incorporated therein; first switch means incorporated in said circuit, said first switch means cooperating with said seat belt; and second switch means cooperating with said seat and having at least a portion thereof extending generally parallel to an upper surface of said seat, said portion being deflected from a normal position when an occupant occupies said seat, said first and second switch means and circuit being arranged for actuating said warning device when an occupant occupies said seat and said seat belt is not in encompassing relation, said seat having a cushioning material between upper and lower surfaces thereof and said second switch means including a switch having a movable element to actuate said switch and an elongated actuating strap cooperating with said movable element, said actuating strap having longitudinally spaced projections extending toward said movable element and capable of being self-supporting in a substantially planar condition, said strap being located below and generally parallel to said upper surface of said seat and being deflectable between opposite ends when an occupant occupies said seat.

7. The combination as defined in claim 6, in which said switch includes first and second elongated resilient metal contact strips and support means defining an elongated passage receiving said contact strips and normally holding said contact strips in spaced relation, said first contact strip acting as said movable element, and in which said strap is adjacent said first contact strip.

8. The combination as defined in claim 7, further including a casing enclosing said switch and said strap.

9. The combination as defined in claim 8, in which said first contact strip and said strap are located above said second contact strip and said second switch means is located between the upper and lower surfaces of said seat and is surrounded by said cushioning material, the further improvement of a second supporting elongated strap below said switch and inside said casing; and means for interconnecting opposite ends of said straps and said switch.

10. The combination as defined in claim 8, in which said casing includes upper and lower membranes interconnected along peripheral edges thereof with said switch and strap sandwiched between said membranes, said membranes having sufficient rigidity to be substantially self-supporting in a single plane.

11. The combination as defined in claim 9, in which said support means comprises a hollow ribbon of substantially rectangular configuration having upper and lower surfaces, said upper surface being substantially flat and said lower surface being convex and in which said straps are generally flat.

12. Switch means for use in a seat and cooperating with a warning device to give a warning signal when an operator occupies the seat and fails to buckle a seat belt cooperating with the seat, comprising an elongated switch having first and second resilient metal strips adapted to engage each other and support means for normally maintaining said strips in spaced relation to each other; an actuating member cooperating with said switch, said actuating member being substantially coextensive with said switch; and an elongated casing enclosing said switch and said actuator, said support means including a resilient non-conductive member having an elongated passage receiving said strips and normally maintaining said strips in spaced relation, said actuating member including a first elongated resilient strap having projections engaging said resilient non-conductive member adjacent said first resilient metal strip, said projections being in the form of dimples deformed from said strap and producing substantially point contact between said first resilient strap and said non-conductive member.

13. Switch means as defined in claim 12, the further improvement of a second resilient strap between said casing and said non-conductive member adjacent said second resilient metal strip; said first and second strips being constructed of spring metal having sufficient rigidity to normally remain in a substantially planar condition.

14. Switch means as defined in claim 12, in which said casing includes upper and lower substantially planar membranes having peripheral edges interconnected, said switch and resilient strap being sandwiched between said membranes with said strap being located between said switch and said upper membrane, said lower membrane consisting of a sheet of resinous material and having sufficient rigidity to be substantially self-supporting in a single plane, said upper membrane having sufficient rigidity to compress said switch when forces are applied to substantially any portion of the exposed surface of said upper membrane.

15. A seat sensing mechanism for use with a seat having cushioning material between upper and lower surfaces thereof comprising a switch having first and second elongated electrically conductive members and support means normally maintaining said members in spaced relation to each other; an actuating member substantially coextensive with said members, said actuating member having projections extending toward said switch; means for maintaining at least one end of said actuating member in a substantially fixed relation to an adjacent end of said switch; and a flexible frame enclosing said switch and actuating member so that compression of the cushioning material will cause said frame and said actuating member to deflect between opposite ends and produce engagement of said conductive members.

16. In combination with a seat having cushioning material between upper and lower surfaces thereof, a switch cooperating with said seat and located below said upper surface, said switch comprising a pair of elongated narrow conductive members; a resilient member having a passage receiving said conductive members and normally maintaining said conductive members in spaced relation to each other, said conductive members having means for producing substantially point contact at longitudinally spaced locations in response to deflection of said members towards each other; and means cooperating with said conductive members to cause engagement of said members in response to compression of said cushioning material, said last means including at least one elongated element substantially coextensive with one of said members, said element being flexed between opposite ends in response to compression of said cushioning material.

17. Switch means for use in actuating a warning device comprising an elongated switch having first and second resilient metal strips; a resilient non-conductive member having an elongated passage receiving said strips and normally maintaining said strips in spaced relation; and an elongated resilient actuator, said actuator including an elongated strap having sufficient rigidity to remain in a substantially planar condition when no external force is applied to said strap, said strap having a plurality of spaced dimples deformed from said body and engaging said non-conductive member adjacent said first resilient metal strip, said dimples producing substantially point contact between opposite lateral edges of said strap and said non-conductive member between opposite lateral edges of said strips so that deflection of said strap from its planar condition by an external force applied thereto will cause said dimples to produce engagement between said metal strips.

18. Switch means as defined in claim 17, in which said strap is metal.

* * * * *